Nov. 8, 1966

J. J. A. BRUNEL 3,284,703

HALL EFFECT DEVICE UTILIZED TO COMPENSATE FOR VARIABLE
INDUCED FIELDS IN OTHER SENSORS

Filed May 28, 1963

Inventor
Joseph Jean André Brunel
By Cushman, Darby & Cushman
Attorneys

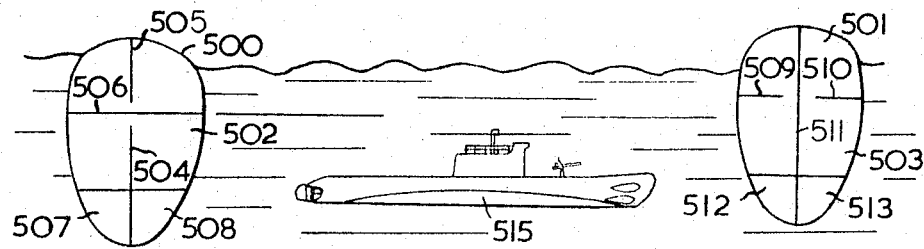
FIG. 7
FIG. 8
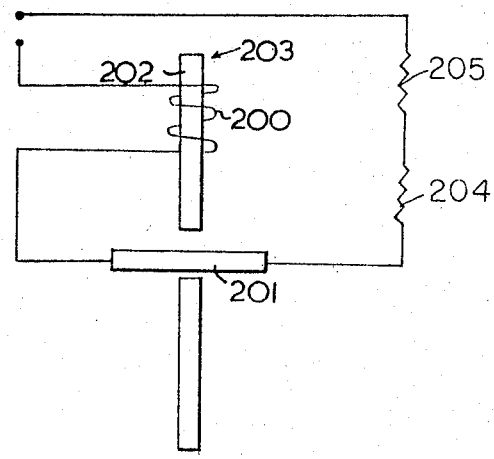

United States Patent Office 3,284,703
Patented Nov. 8, 1966

3,284,703
HALL EFFECT DEVICE UTILIZED TO COMPENSATE FOR VARIABLE INDUCED FIELDS IN OTHER SENSORS
Joseph Jean André Brunel, Montreal, Quebec, Canada, assignor to Canadair Limited, St. Laurent, Quebec, Canada, a corporation of Canada
Filed May 28, 1963, Ser. No. 283,765
Claims priority, application Canada, Jan. 14, 1963, 866,433
6 Claims. (Cl. 324—45)

This invention relates to a magnetic sensing device and such device adapted to compensate for variable induced fields for use in a magnetic anomaly detector installation.

This invention is applicable to land, sea, air and space vehicles or sea mines or buoys carrying the said sensing device. However, for the purpose of this disclosure, the invention is described as applying to a magnetic sensing device installation in an aircraft, brief reference being made wherein such devices are installed in a plurality of strategically positioned buoys.

A magnetic anomaly detector (hereinafter referred to as M.A.D.) in a land, sea, space or air vehicle, is subject to various types of magnetic field intereferences that produce error signals in the installation and thus interfer with its operational capabilities. These various fields include:

(a) Permanent magnetic fields.
(b) Eddy current fields.
(c) Induced magnetic fields.

These interfering or parasitic fields are usually resolved into sixteen components which are produced in the moving vehicle thereby adversely affecting the detector installation.

It is necessary to compensate for these fields to provide proper operation of the M.A.D. There are known adjustable means of compensating for permanent magnetic fields and eddy current fields. These means include manually adjustable resistors electrically in series with each of the compensating coils concerned in an existing system. The permanent fields are compensated for by varying the current through three mutually perpendicular coils, while the eddy fields are compensated for by adjusting the coils embedded in the tail cone of an aircraft installation.

Briefly there are three basic types of interfering (also termed herein as parasitic) magnetic fields, these are usually resolved into sixteen components and which are produced in by movement of the vehicle carrying the device. These must be compensated for in order to realize the operational capabilities of the sensing device of the installation in the vehicle. The permanent fields normally are resolved into three components; induced magnetic fields normally into five components and the eddy current fields normally into eight components. Each of these sixteen components of the interference would normally require individual components compensation providing the cause of the interference therefrom is sufficiently large to decrease the capability of the sensing device.

The present application, in one aspect, is concerned with adjustable means to compensate for interfering induced magnetic fields in a M.A.D. installation. Such magnetic fields are variable, being dependent upon several factors, which include orientation of the aircraft with respect to the earth's magnetic field, and orientation of the aircraft's various structural components and equipment. The aircraft components are usually of soft magnetic members, thereby being readily susceptible to having magnetic fields induced therein. The causes and effects of induced magnetic fields are well known in the art, and a further discussion of the same is believed unnecessary.

A known method for compensating for induced magnetic fields, consists of an arrangement of strips made of materials such as those identified by the trade mark "Permalloy." "Permalloy" is a high permeability alloy of nickel and iron. These strips are, secured to the aircraft near the detecting head of the magnetometer in the system. Such detecting heads are known in the art and are usually located in the tail cone of an aircraft (or adjacent thereto). The strips are of a high permeability material and are fixed in position and thus cannot be readily changed. These strips normally are adjusted for one local. Adjustment however, for one local is not necessarily suitable for other locals. Furthermore, the strips only provide an approximate compensation.

In a further aspect of the present invention there is provided a sensing device adapted to sense movement of an object with respect thereto and provide an output signal in response to such movement.

In the preferred form of such application at least a pair of magnetic sensing devices, to be described in detail hereinafter, are strategically position and have the outputs therefrom connected to a pair of transmitters adapted to send a signal to be received at a remote location, said output being responsive to movement, with respect to said sensing devices, of an object setting up a magnetic field disturbance, the received signals giving an indication of the orientation of the object with respect to said sensing devices.

It is the principal object of the present invention to provide a relatively simple adjustable means to compensate for the effects of interfering induced magnetic fields in a M.A.D. installation.

It is a further object to provide such compensating means which is adjustable during flight of the aircraft.

Investigations into automatic compensating means resulted in utilizing the Hall effect. Since the principle of the Hall effect is important to the present invention, a brief explanation of the same will be given at this point.

Technical dictionaries have defined the Hall effect as "the development of a potential difference between the two edges of a strip of metal in which electrical current is flowing longitudinally, when the plane of the strip is perpendicular to a magnetic field." This definition is taken from Electronics Dictionary by Cooke and Marcus, published by McGraw-Hill Book Company. The Hall coefficient has also been defined in the International Dictionary of Physics and Electronics by Van Nostrand and it is defined as follows:

The measure of the Hall effect is:

$$R_h = \frac{E_y}{J_x H_z} \quad (1)$$

where $E_y$ is the electric field development in the Y direction when a current density of J, flows in an X direction through the magnetic field $H_z$ in the Z direction. The Hall effect is further defined therein as "the development of a transverse electric potential-gradient in a current carrying conductor upon the application of a magnetic field." The difference between this and the previous definition, is that the magnetic field is not limited to being perpendicular to the strip.

The Hall electric field at any given point in a semiconductor is given by the following formula:

$$E_h = K_h J B \quad (2)$$

where $E_h$ is the Hall electric field at any point in a semiconductor, $K_h$ is the Hall coefficient, J is the current density and B is the magnetic field. This is the same as Formula 1 above. The potential differential between the two edges of the small plate is given by the following formula:

$$V_h = \frac{K_h I B}{S} \quad (3)$$

This formula is for a small plate of thickness S, this thickness being small compared with the skin depth, and of a length b, such that the current density J can be considered uniformally distributed over the cross-sectional area sb.

The present invention is based upon the variable induced magnetic field providing a variable output voltage in a device by virtue of the Hall effect, such output being utilized to control the energization of a coil located adjacent to the magnetometer detector coil, thereby providing a reactive compensating field in the induced magnetic fields, thus cancelling their effect upon the magnetometer. The device to produce this desired result based upon the Hall effect is hereinafter terminated a generator.

From Equation 3, it is seen, that the voltage $V_h$ is dependent upon the current I. Accordingly, the output of the generator may be further varied by varying the input current I.

Accordingly, in one aspect, the present invention consists of a magnetometer system and adjustable compensating means therein to effect compensation for induced magnetic fields to thereby render the latter ineffective to said system.

A further aspect of the invention consists of a M.A.D. detector system having a magnetometer therein, a compensating coil disposed in the system whereby actuation of said coil affects the detection of said system and a generator responsive to an induced interfering magnetic field and having the output therefrom electrically connected to said compensating coil.

The invention is illustrated by way of example in the accompanying drawing wherein:

FIGURE 7 is a diagrammatic illustration of a further application of a generator constructed in accordance with the present invention; and FIGURE 8 is a modified generator having a compensating winding disposed about a concentrator rod.

Figure 2:
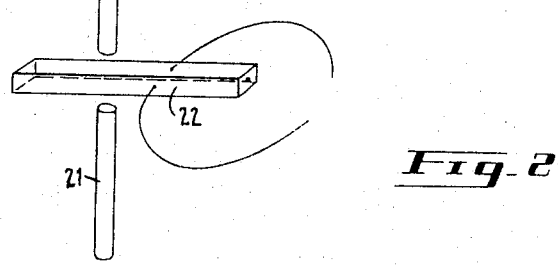
FIGURE 2 is a diagrammatic illustration of a Hall magnetometer.

A generator 10, based upon the Hall effect and constructed in accordance with the present invention, is illustrated in FIGURE 2 and consists of a pair of axially aligned rods 20 and 21 having a semi-conductor 22 disposed therebetween. The rods are in an electrically insulated spaced relationship with the respective faces of the semi-conductor. The rods are further rigidly supported, the assembly of rods and semi-conductor being retained by a suitable jig (not shown).

The semi-conductor 22 has a pair of opposite end terminals 16 and 17 electrically connected thereto whereby a potential source may be readily connected to provide a flowing current. A pair of opposed terminals 11 and 12 hereinafter referred to as "Hall electrodes," are electrically connected to the narrow edges of the strip of semi-conductor 22 and such electrodes provide connection to the output of the generator. Pairs of terminals 16 and 17 and Hall electrode 11 and 12 are transversely disposed with respect to one another, while the concentrator rods 20 and 21 are transverse to the edges to which all of said terminals are secured. The generator, with suitable concentrator rods, may also if desired, be utilized as a magnetometer. The rods are of high permeability alloy and act as concentrators, serving to concentrate the magnetic field on the semi-conductor 22. In the case of a M.A.D. installation, this would be the earth magnetic field associated with producing errors caused by induced fields.

The cross-sectional area, length and material of these rods appears to materially affect the sensitivity of the generator. In preliminary tests 4" long permalloy strips were used and indications from this was that 15" long ⅛" diameter rods would be desirable for desired sensitivity. Other length diameters and rods may be used depending upon desired results.

Semi-conductors of Indium-antimonide films have apparently shown interesting results. They apparently have proved to have a Hall mobility as high as 1/60 of the material in bulk. In the instant case, an indium arsenide semi-conductor has proven satisfactory for use in a generator.

Sensitivity of the generator has been found to be materially changed by having at least one high permeability alloy rod adjacent to one face of the generator. Best results have been found to be attained by having the generator disposed between a pair of rods. Further the rods preferably are perpendicular to the surface of the strip.

In one embodiment, a generator 10 constructed in accordance with the present invention has the output Hall electrodes 11 and 12 thereof connected respectively to opposite ends of a compensating coil 13. A source of potential supply 14 through a potentiometer 15 is electrically connected at terminal 16 to the generator while the terminal 17 at the other side of the semi-conductor is connected to ground. Source 14 has the other terminal thereof grounded. Obviously suitable "on" "off" switching means such as breaker 18 or other suitable means may be connected in the supply circuit.

In this system, varying the current supply as by potentiometer or other means to the generator, and feeding the output of the latter to the coils, provides an adjustable means whereby the effect of induced magnetic fields in the M.A.D. may be compensated.

Figure 1:
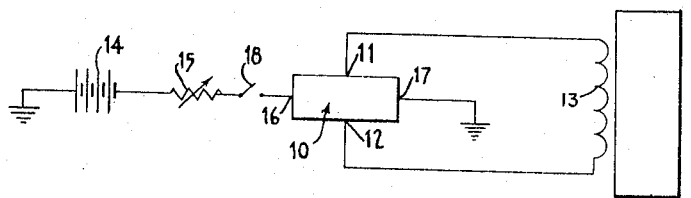
FIGURE 1 is a schematic diagram of a compensating means for induced magnetic fields in a M.A.D. system.

In an aircraft installation the power supply 14 is the normal aircraft current supply with the current control located at the M.A.D. control station. The generator 10 is preferably located in the aft position of the fuselage and is connected to the output coil located in the tail cone adjacent the detector coil of the M.A.D. system as indicated schematically in FIGURE 1 of the drawings.

Figure 4:
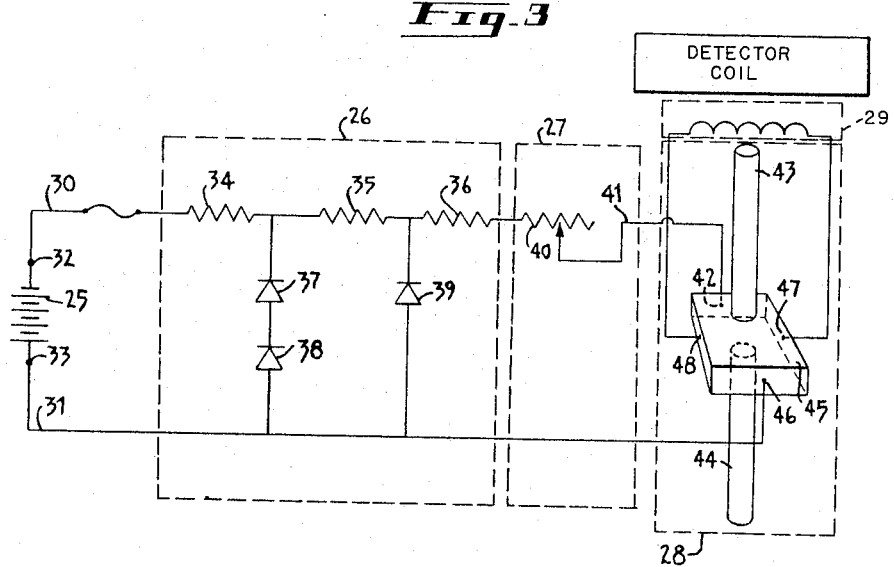
FIGURE 4 is a partial schematic and diagrammatic illustration of the preferred form of the invention.
Figure 5:
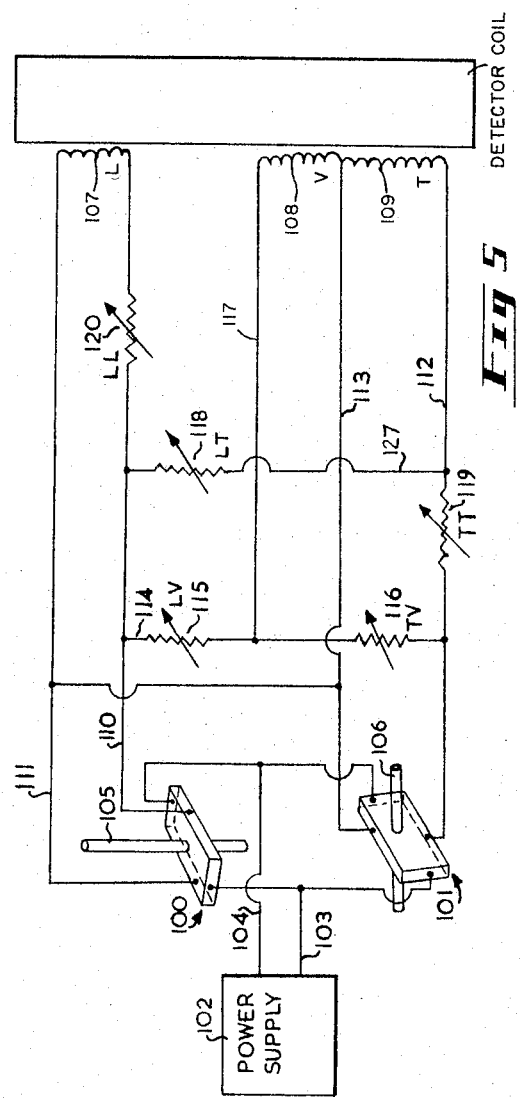
FIGURE 5 is a schematic diagram of a modified compensating means.
Figure 6:
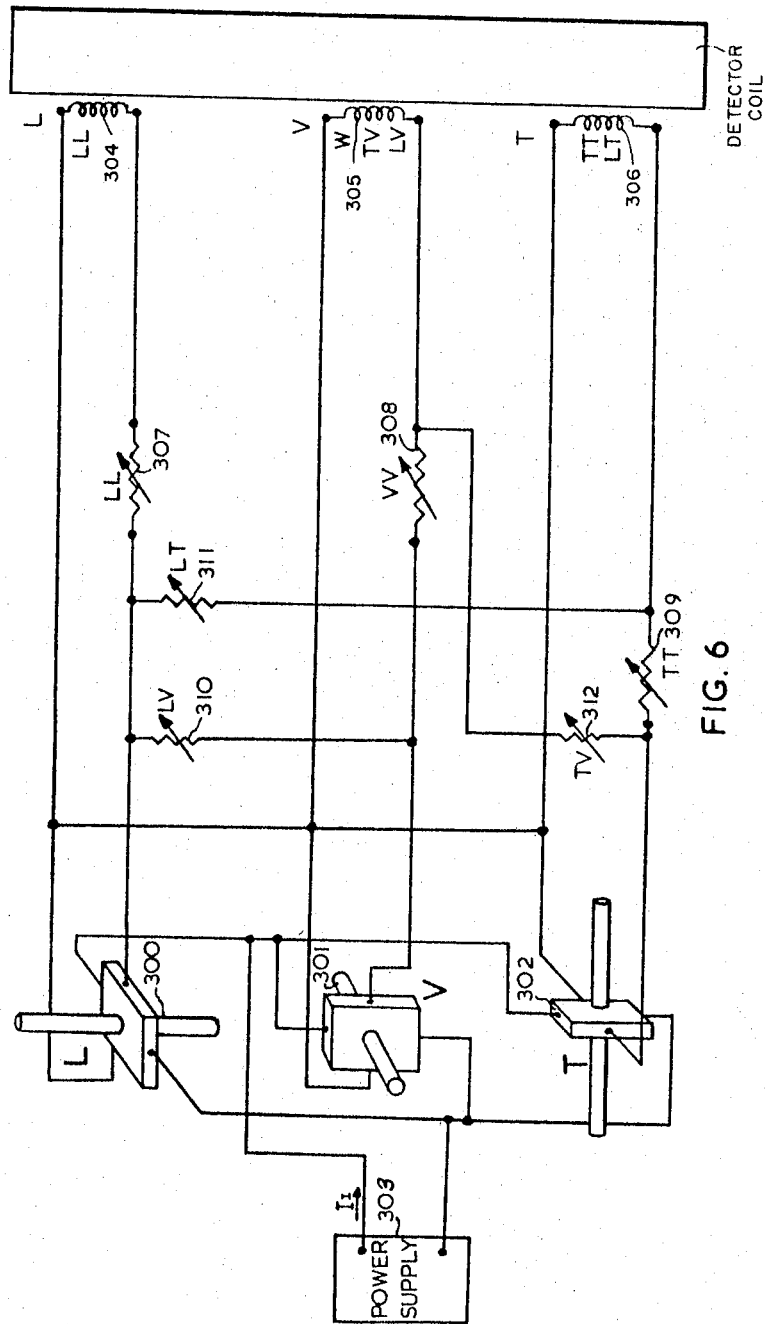
FIGURE 6 is a schematic diagram of a three generator compensating system.

A preferred embodiment of the invention, as regards to a compensating means in a M.A.D. installation, is illustrated in FIGURES 4, 5 and 6, the latter two figures being schematic illustrations.

Figure 3:
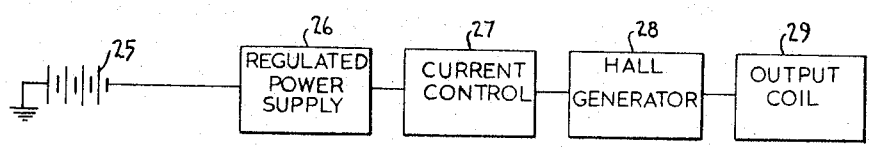
FIGURE 3 is a block diagram of a preferred embodiment of the invention.

Shown in FIGURE 3 is a D.C. voltage supply 25, a voltage supply regulation means 26, current control means 27, a generator 28 and an output coil 29.

Referring now to FIGURE 4, the D.C. supply 25 is connected across leads 30 and 31, by respective terminals 32 and 33. The power regulating means 26 consists of resistors 34, 35, 36 serially connected to lead 30; serially connected zener diodes 37 and 38 connected across leads 30 and 31; intermediate resistors 34 and 35; and zener diode 39. Zener diode 39 is connected across leads 30 and 31 intermediate resistors 35 and 36 and is parallel to the other serially connected diodes. In an actual device, resistors 34, 35, 36 had the following respective values 25Ω, 10Ω and 15Ω. The current control 27 consists of a potentiometer 40, having one terminal thereof connected to lead 30 while the other is connected through lead 41 to terminal 42 of the generator. In the previously referred to values, the potentiometer used had a resistance of 2000Ω.

The generator 28 consists of a pair of axially aligned high permeability concentrators 43 and 44 having a flat relatively thin semi-conductor 45 disposed therebetween. The concentrators 43 and 44 are perpendicular to the flat faces of the semi-conductor 45 and are electrically insulated therefrom.

Terminal 42, to which lead 41 is connected, is located on one end of the semi-conductor 45 while the terminal 46, at the opposite end, is connected to lead 31.

Regulated current from the power supply 25 thereby is adapted to flow through the semi-conductor. Furthermore, such current can be manually adjusted by the potentiometer 40.

Hall electrodes 47 and 48 located respectively on opposite edges of the semi-conductor, transverse to terminals 42 and 46, are connected respectively to opposite ends of the output coil 29.

As previously described, varying the current input to the semi-conductor or the magnetic field input, in this case through concentrators 43 and 44, through the Hall effect, varies the output potential across Hall electrodes 47 and 48. The output of coil 29 thereby is readily varied.

The coil 29 is physically located adjacent the detector coil of the M.A.D. magnetometer as schematically indicated in FIGURE 4 of the drawings and both coils are so orientated with respect to the axis of the aircraft that the output of coil 29 can compensate for the interfering induced magnetic field.

Alternatively the coil 29 may be disposed of and the output of the generator then fed directly to the detecting coil of the main magnetometer of the M.A.D. installation. The output of the generator in such case would be connected so as to oppose the induced field in the main coil.

FIGURES 3 and 4 illustrate a single channel, i.e. one compensating coil and one generator. A number of such channels may be used in any one M.A.D. system all of which may be supplied from a common source. The generators of the various channels may be orientated so as to be sensitive to and thereby compensate for various components of the interfering induced magnetic fields.

An alternative construction is illustrated in FIGURE 5 wherein the number of components of the compensating system is decreased from that of the embodiment shown in FIGURE 4, by interconnecting components in the circuit. In this alternative form the output of the generator is varied whereas in the embodiment illustrated in FIGURE 4, the D.C. supply to the generator is varied.

Shown in FIGURE 5 are generators 100 and 101 each connected to a common D.C. voltage supply 102 through leads 103 and 104. Generator 100 is orientated such that it is sensitive to all the components of the induced magnetic field generally parallel to the longitudinal axis of the aircraft and generator 101 is orientated perpendicularly to generator 100 in such a way that it is sensitive to the combined effects of all the horizontally and vertically transverse components of the interfering induced magnetic fields.

The axis of concentrators 105 of the generator 100 may have the axis thereof parallel to the longitudinal axis of the aircraft while the concentrators 106 of the generator 101 may be transverse to the longitudinal axis of the aircraft. The axis of concentrators 106 will be inclined to both the vertical and the horizontal.

The outputs of the Hall generators are connected to output coils 107, 108 and 109 and such coils are further interconnected by variable resistors to thereby provide various adjustments. The coils 107, 108 and 109 are located adjacent the detecting coil of the M.A.D. unit as schematically indicated in FIGURE 5 of the drawings.

The output leads 110 and 111 are connected respectively to opposite ends of coil 107, the latter being orientated to compensate for components of induced magnetic fields that are parallel to the longitudinal axis of the aircraft. Leads 112 and 113 of generator 101 are connected respectively to opposite ends of coil 109, the latter being orientated to compensate for components of induced magnetic fields horizontally transverse to the longitudinal axis of the aircraft.

Leads 110 and 112 are interconnected by lead 114 having a pair of serially connected variable resistors 115 and 116 connected therein. A lead 117 is connected at one end intermediate resistors 115 and 116 and at the other end is connected to coil 108. The other lead of coil 108 is connected to return leads 113 and 111. Coil 108 is orientated to compensate for magnetic components, of induced magnetic fields, that are vertically transverse with respect to the longitudinal axis of the aircraft. Leads 112 and 110 are further interconnected through lead 127 having a variable resistor 118 connected therein. A variable resistor 119 is electrically connected in lead 112 intermediate leads 114 and 127. A variable resistor 120 is connected in lead 110 intermediate lead 127 and coil 107.

Variable resistors 115, 116, 119, 118 and 120 are further respectively designated LV, TV, TT, LT, and LL and coils 107, 108 and 109 are also further designated respectively L.V.T. These letters L, V and T, designate respectively, longitudinal, vertical and transverse axis with respect to the aircraft. Accordingly, the various adjustments effected by each variable resistor are as designated in FIGURE 5, by the various letters, i.e. L, V of resistor 115 indicates adjustment effected by such resistor for longitudinal and vertical components.

The circuit of FIGURE 5 will cater for the normally significant components of induced interference fields and compensates for all components in any one axis and does not provide individual compensation for all components simultaneously.

If desirable, three orthogonal generators in conjunction with any two output coils can be used instead of the circuit shown and described with respect to FIGURE 5.

Shown in FIGURE 6 are three generators 300, 301, 302 connected to a common power supply 303, the output of the above generators being respectively connected to compensating coils 304, 305 and 306 and said coils being physically located adjacent the detecting coil of the M.A.D. unit as schematically indicated in FIGURE 6 of the drawings. Variable resistors 307, 308 and 309 are respectively connected in series with the above coils. The circuit of coil 304 is connected to that of coils 305 and 306 by respective variable resistors 310 and 311, while the circuits of coils 305 and 306 are interconnected through variable resistor 312.

It is also possible to compensate for all five components with the two generators and two output coils by mounting the generators at an appropriate angle with respect to the axis of the aircraft.

It is even possible to compensate all five induced components with only one generator and one output coil by mounting both the generator and output coil at a suitable angle with respect to the aircraft axis, but then the five components of induced fields cannot be varied individually but only as a whole.

The compensation procedure is carried out in a standard way by varying the appropriate rheostat (e.g. LV) while performing a certain flight manoeuvre to compensate a particular component (e.g. LV).

A plurality of the aforedescribed generators may be supported one each in a plurality of strategically positioned buoys to detect objects such as submarines, ships or the like relatively moving with respect thereto. The generators, in such installation, have outputs therefrom transmitted to a remotely positioned receiver, which, by comparison of the signals, gives an indication of the orientation of the vessel with respect to the generators.

FIGURE 7 diagrammatically illustrates a pair of spaced buoys 500 and 501 housing respective generators 502 and 503. The generator 502 consists of concentrator rods 504 and 505 having a semi-conductor 506 disposed therebetween. Power source 507 may be connected to the generator and also to a signal transmitter 508, the latter being connected to and responsive to the output of the generator.

The generator 503 consists of concentrator rods 509 and 510 having a semi-conductor strip 511 disposed therebetween. The concentrator rods of generator 501 may be angularly disposed with respect to those of generator 502 as illustrated in the drawing.

Confined in buoy 501 is a power supply 512 and transmitter 513 connected similarly as comparative components 507 and 508.

A submarine 515 moving relatively with respect to the buoys is detected by the generators and the signals therefrom transmitted to a remotely located receiver. The received signals may be readily processed to give visual or otherwise indication of the location of the submarine.

In FIGURE 8 is shown one means for zero adjustment of the readings from the generator. The D.C. supply to the semiconductor causes in some instances an unwanted component in the output signal from the generator. This component is directly proportional to the current magnitude and is undesirable when using the generator to detect the strength of the earth's magnetic field. In such instance it is desirable to have the output of the generator solely a function of the earth's magnetic field.

A coil 200 connected in series with the D.C. supply and semi-conductor 201 and disposed about a concentrator rod 202 of a generator 203 can be used to compensate for the unwanted component caused by the D.C. supply. The coil contains a determined number of coils which are energized by the current causing the unwanted component and these turns create a field cancelling the unwanted component. Also shown in FIGURE 8 is a pair of temperature responsive resistors 204 and 205 connected in series with the D.C. supply and the semi-conductor strip 201. The purpose of these resistors is to eliminate temperature dependence of the Hall input current.

I claim:

1. A device for sensing magnetic variations comprising a strip of semi-conductor material having a pair of oppositely disposed relatively flat faces, a pair of spaced side edges substantially parallel to the longitudinal axis of said strip and a pair of opposite end edges transverse to said side edges, a pair of concentrator rods disposed adjacent opposite faces of said strip and electrically insulated therefrom, means for connecting the end edges in series with an electrical power supply such that a supply current flows through the semi-conductor strip, output Hall electrodes on said side edges, and a coil serially connected with said strip and power supply and having the windings thereof disposed about one of said concentrator rods the number of winding turns in said coil and the connection thereof being such that the magnetic field of said coil opposes and substantially cancels a component of the magnetic field set up by the electrical power supply.

2. A device adapted to compensate for induced magnetic fields interfering with a magnetometer system including a detecting coil associated therewith, comprising in combination: a Hall effect generator including a semi-conductor having a pair of oppositely disposed faces, and a magnetic field concentrator adjacent one of said faces, electrical circuit means connected to a regulated electrical power supply for supplying an input current through said semi-conductor, said electrical circuit having a coil serially connected therein with the windings of said coil disposed about a portion of said magnetic field concentrator, said coil connected such that the magnetic field set up therein opposes a component of the magnetic field produced by the electrical power supply, said generator being sensitive to a concentration of said interfering magnetic field and producing an output in response thereto, means feeding the output of said generator to said magnetometer system in opposition to said interfering magnetic field, and means for selectively adjusting the magnitude of said output to compensate for the effects of said induced magnetic field on said magnetometer system.

3. A device as claimed in claim 2 wherein said means feeding the output of said generator to said detector system comprises a compensating coil electrically connected to the output of said generator and located adjacent said detector coil, the field of said compensating coil being in opposition to said interfering magnetic field whereby the effect of the interfering magnetic field is substantially eliminated from said system.

4. An induced magnetic field compensator for magnetic anomaly detectors comprising first and second Hall effect generators each having a pair of main terminals, a pair of Hall electrodes, and at least one magnetic field concentrator, a potential source, an input circuit connecting said main terminals of both said generators to said potential source, said input circuit having therein means regulating the supply of power received from said potential source, a first output circuit connected to said Hall electrodes of said first generator and comprising a first current control means and a first compensating coil, a second output circuit connected to said Hall electrodes of said second generator and comprising a second current control means and a second compensating coil, said output circuits being interconnected by a third current control means, and a second interconnection including two serially connected current control means, a third compensating coil having one end connected intermediate said two serially connected current control means in said second interconnection and the other end connected to said second compensating coil, said first and second generators having their magnetic field concentrators obliquely disposed with respect to one another so as to be sensitive to selected components of interfering induced magnetic fields, and said compensating coils being located adjacent the detector coil of said anomaly detector and having the fields thereof in opposition to respective ones of the selected components to thereby compensate for said interfering induced magnetic fields.

5. An induced magnetic field compensator for magnetic anomaly detectors comprising a first, second and third Hall effect generator each having a pair of main terminals, a pair of Hall electrodes and at least one magnetic field concentrator, a potential source, an input circuit connecting said main terminals of all said generators to said potential source, said input circuit having therein means regulating the supply of power received from said potential source, each of said generators having an output circuit connected to said Hall electrodes, each output circuit having therein current control means and a compensating coil, said output circuits of said generators being interconnected through current control means, said generators having the concentrators thereof obliquely disposed with respect to each other so as to be sensitive to selected components of interfering induced magnetic fields, said compensating coils being located adjacent the detector coil of said anomaly detector and having the fields of the respective coils in opposition to the selected components of the interfering magnetic field to thereby compensate for the effect of the interfering induced magnetic fields in said system.

6. In an airborne magnetic anomaly detector system having a magnetometer with a detector coil associated therewith, a Hall effect generator associated with said system and sensitive to induced magnetic field interference in said system and comprising a semi-conductor having a pair of oppositely disposed faces, a high permeability body disposed adjacent at least one of said faces and electrically insulated therefrom for concentrating the interfering magnetic field adjacent said face, a regulated source of potential, electrical circuit means connecting said source of potential to opposed ends of said semi-conductor to provide a flow of current therethrough, said electrical circuit having a coil and a temperature responsive resistor serially connected therein with the windings of said coil disposed about a portion of said high permeability body, said coil being connected such that the magnetic field set up in said coil is in opposition to the magnetic field component set up by the flow of current in said electrical circuit, and Hall output electrodes on opposed edges of said semi-conductor, said edges, ends, and faces being substantially mutually perpendicular, and a compensating coil electrically connected to said output electrodes, said compensating coil being oriented such that a magnetic field set up therein in response to the generator output is opposed to said interfering magnetic field, and means for varying the magnitude of the current flowing through said semi-conductor thereby to selectively vary the magnitude of the output of said generator such that the induced magnetic field interference is substantially compensated for.

References Cited by the Examiner

UNITED STATES PATENTS

| | | | |
|---|---|---|---|
| 2,697,186 | 12/1954 | Anderson | 324—43 |
| 2,834,939 | 5/1958 | Tolles | 324—43 |
| 2,906,945 | 9/1959 | Weiss | 317—34 |
| 2,996,655 | 8/1961 | Byles | 322—25 |
| 3,008,083 | 11/1961 | Kuhrt et al. | 324—45 X |
| 3,197,880 | 8/1965 | Rice et al. | 324—45 X |

FOREIGN PATENTS

| | | |
|---|---|---|
| 868,765 | 5/1961 | Great Britain. |
| 352,741 | 4/1961 | Switzerland. |

OTHER REFERENCES

Ross et al.: Journal of Scientific Instruments, vol. 34, December 1957, pp. 479–484 inclusive.

Wieder: Journal of Applied Physics, vol. 33, No. 3, March 1962, pp. 1278 and 1279.

WALTER L. CARLSON, *Primary Examiner.*

MAYNARD R. WILBUR, CHESTER L. JUSTUS,
*Examiners.*

R. J. CORCORAN, *Assistant Examiner.*